Patented Oct. 12, 1937

2,095,335

UNITED STATES PATENT OFFICE 2,095,335

SOLDERING FLUX

Harry C. Kofke, Philadelphia, Pa., assignor to Frank D. McBride, trading as American Solder & Flux Co., Philadelphia, Pa.

No Drawing. Application September 1, 1936, Serial No. 99,007

6 Claims. (Cl. 148—25)

This invention relates to an improvement in soldering flux.

Heretofore various substances and compounds have been used as a flux in soldering, but variously have been disadvantageous for one reason or another. Thus the fluxes heretofore used have been disadvantageous variously in that in use they require an inflammable solvent, as alcohol, and hence present a fire hazard; they will not wet greasy surfaces and hence are inefficient; they are of limited activity and hence are not effective in the soldering of various metals and metals which are rusted; they are corrosive; they are volatilized by the heat of the soldering iron, etc.

Now in accordance with this invention there is provided a soldering flux of general adaptability and free from the disadvantages recognized variously in fluxes heretofore known, and at the same time a soldering flux which will be produced readily and inexpensively.

From the broad standpoint the soldering flux in accordance with this invention will comprise a reaction product of triethanolamine with an acid from the group consisting of salicylic acid, a rosin, as American wood or gum rosin, French rosin, a hydrogenated rosin, etc. or a rosin acid, as abietic acid, pimaric acid, a hydrogenated rosin acid, etc., benzoic acid, and oleic acid, phosphoric acid, palmitic acid.

More specifically this invention contemplates mixtures of the reaction products defined above and still more specifically a mixture of the reaction products of triethanolamine with salicylic acid, a rosin or rosin acid.

The soldering flux in accordance with this invention will be prepared by admixing triethanolamine and one or more of the acids above mentioned and agitating at room temperature until reaction is complete. The reagents may be reacted in molecular proportions, but generally it will be desirable to use a small excess of triethanolamine, so that the product formed is definitely alkaline. Where, for example, a rosin or rosin acid is used, it will be reduced to a fluid state by heat, or by the use of a suitable solvent, as methyl alcohol, ethyl alcohol, acetone, etc., for reaction with the triethanolamine. The reaction may be expedited, if desired, by the application of heat to the reaction mixture, the particular temperature, for example, from about 70° C. to about 100° C. depending upon the reagents used.

As specifically illustrative of a soldering flux according to this invention and of modus operandi for its production, for example, about 149 grams of trienthanolamine of 85–90% purity and about 302 grams of American wood rosin in a fluid state and comprising largely abietic acid are mixed together and permitted to react. On completion of the reaction the flux comprising largely triethanolamine abietate, a thick liquid, is ready for use as is, or in solution in water, or in the form of a paste formed by the addition of, for example, petrolatum.

As further illustrative, for example, 138 grams of salicylic acid and 149 grams of triethanolamine, of 85–90% purity, are reacted for the production of triethanolamine salicylate, which may be used as such, or in solution in water, or in the form of a paste formed by the addition of, for example, petrolatum.

As further illustrative, a soldering flux in accordance with this invention may comprise a mixture of the reaction products of the above examples in widely varying proportions. Thus, for example, an efficient flux may comprise 25 parts, by weight, of triethanolamine salicylate and 75 parts, by weight, of triethanolamine abietate. The mixture may be used as such, in solution in water or as a paste formed by the addition of, for example, petrolatum.

Mixtures of the reaction products may be produced by simultaneously reacting two or more of the acids defined with triethanolamine, desirably using an excess of triethanolamine in order that the product be alkaline. Thus a flux may be produced by reacting 298 grams of triethanolamine, of 85–90% purity, 302 grams of American wood rosin and 138 grams of salicylic acid simultaneously.

The soldering flux in accordance with this invention will be found to be non-corrosive, to wet greasy surfaces readily, to withstand soldering temperatures, to be highly active and to hence enable the soldering of steel or iron, bright zinc, brass, copper, electroplated surfaces and rusted surfaces, and to possess the advantage of solubility in water rendering its use in solution wholly free from fire hazard.

What I claim and desire to protect by Letters Patent is:

1. A soldering flux comprising a reaction product of triethanolamine with an acid from the group consisting of salicylic acid, benzoic acid and phosphoric acid.

2. A soldering flux comprising a reaction product of triethanolamine with an acid from the group consisting of salicylic acid, benzoic acid and phosphoric acid and in admixture therewith a triethanolamine fatty acid soap.

3. A soldering flux comprising a reaction product of triethanolamine with an acid from the group consisting of salicylic acid, benzoic acid and phosphoric acid and with a fatty acid.

4. A soldering flux comprising a reaction product of triethanolamine with an acid from the group consisting of salicylic acid, benzoic acid and phosphoric acid and in admixture therewith triethanolamine abietate.

5. A soldering flux comprising a reaction product of triethanolamine with salicylic acid and in admixture therewith triethanolamine abietate.

6. A soldering flux comprising about 25 parts by weight of a reaction product of triethanolamine with an acid from the group consisting of salicylic acid, benzoic acid and phosphoric acid and in admixture therewith about 75 parts by weight of triethanolamine abietate.

HARRY C. KOFKE.